United States Patent
Haberkorn et al.

[15] 3,655,150
[45] Apr. 11, 1972

[54] AIRCRAFT JET ENGINE WITH VECTORING NOZZLE FOR CONTROL PURPOSES

[72] Inventors: Erich J. Haberkorn, Riemerling; Klaus Englaender, Munich, both of Germany

[73] Assignee: Messerschmitt-Bolkow-Blohm GmbH, Munich, Germany

[22] Filed: June 17, 1970

[21] Appl. No.: 47,008

[30] Foreign Application Priority Data

June 23, 1969 Germany..................P 19 31 747.6

[52] U.S. Cl. ......................244/53 R, 244/12 D, 244/23 D, 244/56, 244/110 B, 239/265.31, 239/265.35
[51] Int. Cl........................................................B64d 33/04
[58] Field of Search..................244/53 R, 53 B, 110 B, 12 D, 244/23 D, 56; 239/265.27, 265.29, 265.31, 265.35

[56] References Cited

UNITED STATES PATENTS

| | | | |
|---|---|---|---|
| 3,290,887 | 12/1966 | Poole | 239/265.35 |
| 2,950,595 | 8/1960 | Laucher et al. | 239/265.31 |
| 3,076,309 | 2/1963 | Brown et al. | 239/265.29 |
| 3,024,604 | 3/1962 | Morley | 239/265.29 |
| 3,483,702 | 12/1969 | Ward | 239/265.29 |

Primary Examiner—Milton Buchler
Assistant Examiner—Steven W. Weinrieb
Attorney—Woodhams, Blanchard and Flynn

[57] ABSTRACT

Aircraft jet engine having a vectoring discharge for pitch and yaw control purposes including means for maintaining such control during low thrust or reversing jet operation. A vectoring nozzle is arranged on the exit of the jet tube in the manner of a ball joint for universal swiveling and the lateral and vertical control obtained thereby. Openings are provided for both the inner and outer portion of the cooperating spherical members such that when the vectoring nozzle swivels on the jet pipe more or less of the openings on the respective sides thereof come into register with each other. By directing the discharge from said openings in a reversing direction, same will function as reversing jets when the nozzle is closed and by swiveling thereof such discharge can be directed to one side or the other of the aircraft to obtain the desired directional control.

6 Claims, 2 Drawing Figures

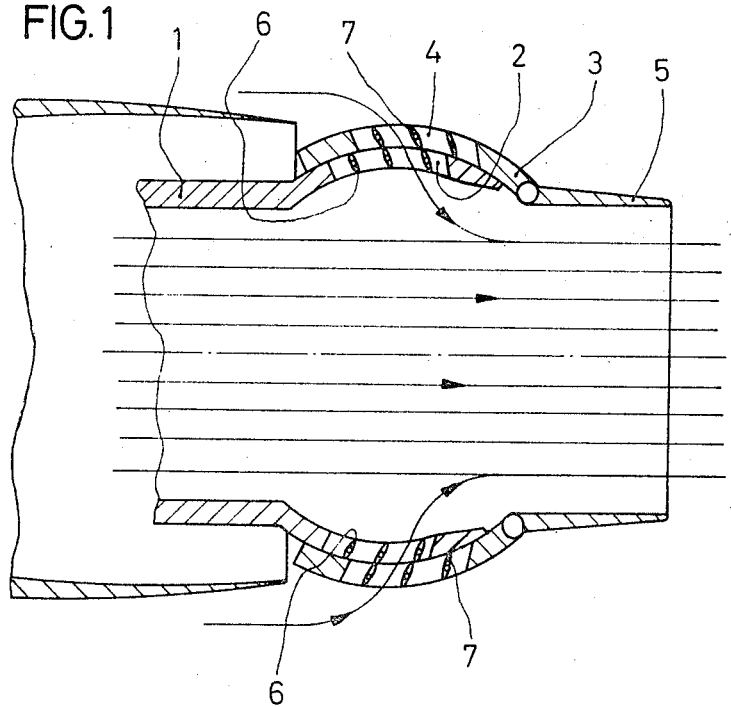
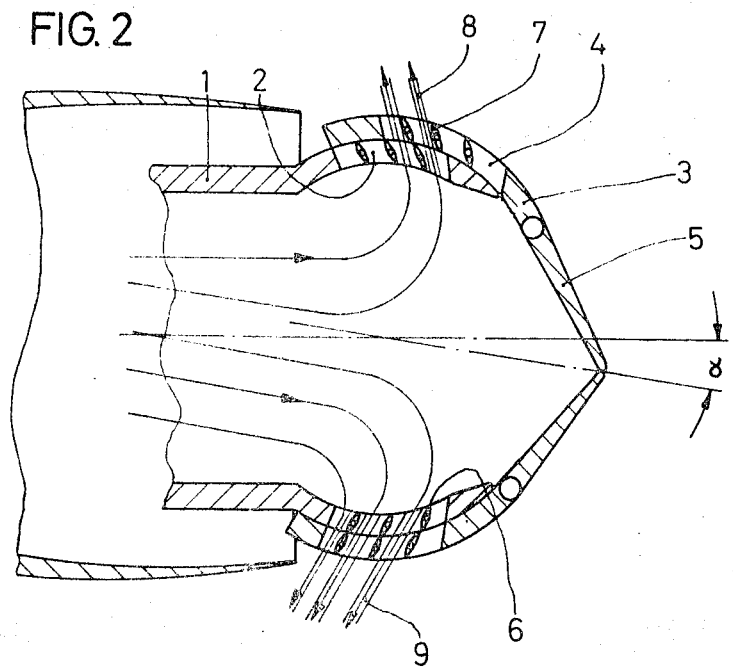

AIRCRAFT JET ENGINE WITH VECTORING NOZZLE FOR CONTROL PURPOSES

The invention relates to an aircraft jet engine with openings arranged forward of the gas exit which serve as ejector openings and outlets for the reversing jet, and with a vectoring nozzle for control purposes supported on the jet pipe end so as to resemble a ball joint.

Using the jet thrust itself for generating the control moments permits the elimination in a presently known way, of tail and stabilizer surfaces for vertical and horizontal control. According to the latest findings, the decrease in drag resulting therefrom may, in high speed flight, amount to more than 20 percent of the total drag.

It is already known to the prior art to deflect the thrust jet by means of a universally vectoring nozzle supported on the jet pipe end so as to resemble a ball joint. The deflection angles required for generating the control moments usually amount to only a few angular degrees. However, to permit thrust reversal for braking purposes, it has also been suggested that the thrust gases be deflected by means of vanes which can be swivelled into the exhaust gas jet to conduct them outwards against the direction of flight through the openings which in normal flight serve as ejector nozzles.

A serious disadvantage of aircraft control by thrust jet deflection is experienced in that a certain minimum thrust must always be present to obtain the necessary control forces, i.e., a certain amount of forward propulsion force must be tolerated to obtain a control force. This is a great drawback, particularly during landing maneuvers which are critical from the standpoint of control.

During thrust reversal, control of the aircraft will be lost completely, because the thrust gases no longer pass through the vectoring control nozzle which can be swivelled by the pilot.

It is the object of the present invention to improve a device of the type mentioned above so that the aircraft may be controlled without additional devices, such as special control nozzles, in every phase, i.e., with forward, neutral or reverse thrust.

The object of the invention is accomplished in that the wall portions of the nozzle and the jet pipe which overlap each other have, in the yaw and pitch axes, openings partly overlapping so that when the nozzle is vectored, a large area is open on the side toward which the nozzle is vectored and a small area is open on the opposite side. When the thrust reverser is not operating, control force with the thrust jet is achieved by having the latter deflected in a selected direction and its force resolved into a propulsion and a control component. In the thrust reversal position, the control force results however from the difference between two braking thrust jets emerging in opposite directions, the difference being caused by the different size of the outlet openings. However, in both cases, operation of the control nozzle results in a control moment in the same direction. The openings may be designed such that the pilot can initiate thrust reversal at constant turbine speed without the control moments being changed.

Another feature of the invention provides that in a jet engine with an exit formed by movable clamshell doors varying the size of the exit, the clamshell doors can be adjusted so as to close the exit completely. Separate thrust reversal doors are unnecessary, so that the design of the entire system is simpler and lighter.

Furthermore, the invention provides that the openings be equipped with adjustable guide vanes. Thus, the gas jet conducted outwards through the openings may be directed in a neutral thrust direction, namely in a direction perpendicular to the axis of the jet pipe 1, whereby the jets respectively emerging at opposite sides balance each other and neither forward nor reversing thrust is produced. However, in this position, too, controllability of the aircraft through operation of the vectoring nozzle is fully maintained.

According to another feature of the invention, the nozzle is adjusted, in a known way, either by a control command of the pilot or by an automatic flight control system.

An embodiment of the invention is shown in the drawing and described in detail in the following. The figures show:

FIG. 1 a central, axial, section of a jet nozzle in the normal position

FIG. 2 a control nozzle according to FIG. 1 vectored and in the thrust reversal position.

Jet pipe 1 is shaped at the exit so that it forms a segment of a sphere. The wall of the spherical segment is provided with several openings 2 which are preferably in the aircraft yaw and pitch axes. Surrounding the spherical segment and supported thereon is a similarly formed portion of the thrust reverser nozzle 3, which may be universally swivelled by any suitable actuators which are conventional and hence not shown. Control nozzle 3 is also provided with several openings 4 which partly overlap the openings 2 as shown. The effective discharge area is thus formed by the area left open by the two groups of openings 2 and 4.

The exit of the nozzle 3 is provided with clamshell doors 5 by which the exit area of the nozzle may be adjusted as desired from fully open to fully closed and any desired intermediate position. Openings 2, 4 are provided with guide vanes 6, 7 which are used for varying the direction of the gases emerging from the openings, the same being positionable by the pilot of the aircraft to direct said gases as desired in a direction perpendicular to the axis of the jet pipe 1 or in a direction as shown in FIG. 2 having a component in the reverse direction.

FIG. 2 shows the device with the clamshell doors completely closed, so that all exhaust gases escape through the openings 2, 4. Vectoring nozzle 3 by an angle $\alpha$ increases the effective area of the lower opening in the figure, while the area of the upper one decreases. The difference between thrust jets 8 and 9 yields the desired control moment.

Thus, in operation with the doors 5 completely open, as in FIG. 1, directional control of the aircraft is obtained by swiveling the nozzle 3 by any convenient controls on the partially spherical segment of the jet pipe 1. With the doors 5 completely closed, as shown in FIG. 2, and the vanes 6 and 7 adjusted to direct the jet gases laterally in a direction perpendicular to the axis of the jet pipe 1, there is no thrust applied to the aircraft in either a forward or reversing direction but movement of the nozzle 3 on the spherical portion of the jet pipe 1 will still effect a desired directional (yaw or pitch) change of the aircraft. Similarly, with the flaps 5 closed and the vanes 6 and 7 directed, as shown in FIG. 2, in a reverse direction, a reverse or braking thrust may be applied to the aircraft while still maintaining directional control by suitable movement of the nozzle 3 on the spherical portion of the jet pipe 1.

A further operational possibility is to provide for a low thrust forward, a low thrust rearwardly or zero longitudinal thrust by partially opening the flaps 5 and balancing the gas escaping therethrough against reversely directed gases escaping through the vanes 6 and 7. Such desired balancing may be obtained either by adjusting the extent to which said flaps are open or, with said flaps in a predetermined partially open position, such balancing may be obtained by adjusting the extent to which the gases escaping therethrough are reversely directed. Under all these conditions, actuation of the nozzle 3 on the spherical portion of the jet pipe 1 will maintain the desired directional control in spite of the above mentioned conditions of low forward or rearward thrust or zero longitudinal thrust.

With this arrangement it can be seen that an extremely versatile control is obtained and that a high level of directional control is obtained regardless of whether the magnitude of axial thrust is obtained by the position of the flaps 5, by the position of the vanes 6 and 7 or by appropriate adjustment of both thereof.

The embodiments of the invention in which an exclusive property or privilege is claimed are defined as follows:

1. A nozzle apparatus mounted on one end of a jet pipe of an aircraft jet engine, comprising:

a hollow, partially spherical first member mounted on said one end of said jet pipe and having an inlet at one end communicating with said one end of said jet pipe and a first outlet at the other end;

means defining a plurality of first openings in said first member upstream of said first outlet;

a hollow, partially spherical second member mounted in telescoping relation to said first member, said second member including means defining a second outlet at one end communicating with said first outlet, one of said first and second members being adapted for movement relative to the other of said first and second members; and means defining a plurality of second openings in said second member upstream of said second outlet, each of said plurality of said second openings communicating with a respective one of said plurality of said first openings, a relative movement between said first and second members causing one of said plurality of first and second openings to move relative to the other of said plurality of first and second openings to thereby regulate the effective cross-sectional area of said first and second openings to thereby control the amount of exhaust gases passing through said first and second openings.

2. A nozzle apparatus according to claim 1, wherein said first and second openings are aligned with a plane formed by the yaw and pitch axes of said aircraft.

3. A nozzle apparatus according to claim 1, wherein said first and second openings are each provided with guide vanes.

4. A nozzle apparatus according to claim 1, wherein said first and second openings are each provided with adjustable guide vanes.

5. A nozzle apparatus according to claim 1, wherein said means defining said second outlet includes means for closing said second outlet whereby when said second outlet is closed a relative movement between said first and second members effectively controls said amount of exhaust gases passing through said first and second openings.

6. A nozzle apparatus according to claim 5, wherein said means for closing said second outlet comprises movable clamshell door means for varying the cross-sectional area of said second outlet between a fully opened position and a fully closed position and any intermediate position.

* * * * *